United States Patent
Catalano et al.

(10) Patent No.: US 10,360,280 B2
(45) Date of Patent: Jul. 23, 2019

(54) SELF-BUILDING SMART ENCYCLOPEDIA

(71) Applicant: International Business Machines Corporation, Armonk, NY (US)

(72) Inventors: Pasquale A. Catalano, Wallkill, NY (US); Andrew G. Crimmins, Montrose, NY (US); Casimer M. DeCusatis, Poughkeepsie, NY (US); Rajaram B. Krishnamurthy, Pleasant Valley, NY (US); Michael Onghena, Poughquag, NY (US); Anuradha Rao, Hopewell Junction, NY (US)

(73) Assignee: International Business Machines Coporation, Armonk, NY (US)

( * ) Notice: Subject to any disclaimer, the term of this patent is extended or adjusted under 35 U.S.C. 154(b) by 570 days.

(21) Appl. No.: 14/955,090

(22) Filed: Dec. 1, 2015

(65) Prior Publication Data

US 2017/0154049 A1 Jun. 1, 2017

(51) Int. Cl.
  *G06F 16/95* (2019.01)
  *G06F 16/958* (2019.01)

(52) U.S. Cl.
  CPC .................. *G06F 16/958* (2019.01)

(58) Field of Classification Search
  CPC .............. G06F 17/3087; G06F 17/30377
  USPC ........................................ 707/743
  See application file for complete search history.

(56) References Cited

U.S. PATENT DOCUMENTS

| | | | |
|---|---|---|---|
| 7,627,565 B2 | 12/2009 | Budzik et al. | |
| 7,810,021 B2 | 10/2010 | Paxson | |
| 9,002,942 B2 | 4/2015 | Klein et al. | |
| 9,015,736 B2 * | 4/2015 | Cordray | G06F 3/0482 725/10 |
| 2007/0226077 A1 * | 9/2007 | Frank | G06F 17/30882 705/26.64 |
| 2008/0005284 A1 | 1/2008 | Ungar et al. | |

(Continued)

FOREIGN PATENT DOCUMENTS

EP 2802142 A1 11/2014

OTHER PUBLICATIONS

Wikipedia, "Tropes Zoom", From Wikipedia, the free encyclopedia, https://en.wikipedia.org/wiki/Tropes_Zoom, Printed on Nov. 5, 2015, pp. 1-3.

(Continued)

*Primary Examiner* — Uyen T Le
(74) *Attorney, Agent, or Firm* — Erik K. Johnson

(57) ABSTRACT

An embodiment of the invention may include a method, computer program product and computer system for building and disseminating a smart encyclopedia. The method, computer program product and computer system may include a computing device that receives source content. The computing device may determine a first relationship. The first relationship corresponds to a relationship between a first portion of the source content and a second portion of the source content. The computing device may determine a first location of the first relationship within an index. The computing device may identify a user location within the index. The computing device may determine whether the user location is located beyond the first location within the index. The computing device may display the first relationship to the user based on the determination that the user location is beyond the first location.

19 Claims, 4 Drawing Sheets

(56) References Cited

U.S. PATENT DOCUMENTS

| | | | |
|---|---|---|---|
| 2008/0021894 A1* | 1/2008 | Styles | G06F 17/30684 |
| 2010/0057762 A1* | 3/2010 | Hatami-Hanza | G06F 17/30713 |
| | | | 707/E17.005 |
| 2010/0250598 A1* | 9/2010 | Brauer | G06F 17/30622 |
| | | | 707/780 |
| 2012/0036423 A1 | 2/2012 | Haynes, II et al. | |
| 2012/0072941 A1 | 3/2012 | Thornberry et al. | |
| 2012/0190386 A1 | 7/2012 | Anderson | |
| 2013/0061140 A1* | 3/2013 | Nseir | G06F 16/9535 |
| | | | 715/273 |
| 2013/0297706 A1* | 11/2013 | Arme | H04N 21/4788 |
| | | | 709/206 |
| 2013/0339443 A1 | 12/2013 | Goldman et al. | |
| 2014/0289173 A1* | 9/2014 | Byron | G06Q 10/00 |
| | | | 706/12 |
| 2014/0297260 A1* | 10/2014 | Allen | G06F 3/04842 |
| | | | 704/9 |
| 2014/0297745 A1 | 10/2014 | Tarbox et al. | |
| 2015/0113058 A1 | 4/2015 | Zhang et al. | |

OTHER PUBLICATIONS

Golbeck, "The Twitter Mute Button: A Web Filtering Challenge", Session: Tweet, Tweet, Tweet!, CHI 2012, May 5-10, 2012, Austin, Texas, USA, pp. 2755-2758.

* cited by examiner

SELF-BUILDING SMART ENCYCLOPEDIA

BACKGROUND

The present invention relates to content aggregation and organization, and more particularly to creating and displaying wiki entries based on a user's personal knowledge.

An encyclopedia is a type of reference work or compendium holding a comprehensive summary of information from either all branches of knowledge or a particular branch of knowledge. Encyclopedias are divided into articles or entries, which are usually accessed alphabetically by keyword. Encyclopedia articles focus on factual information to cover the thing or concept for which the article name relates to.

In lexical analysis, tokenization is the process of breaking a stream of text up into words, phrases, symbols, or other meaningful elements called tokens. The list of tokens becomes input for further processing such as parsing or text mining. Tokenization is useful both in linguistics (where it is a form of text segmentation), and in computer science, where it forms part of lexical analysis.

BRIEF SUMMARY

An embodiment of the invention may include a method, computer program product and computer system for building and disseminating a smart encyclopedia. The method, computer program product and computer system may include a computing device that receives source content. The computing device may determine a first relationship. The first relationship corresponds to a relationship between a first portion of the source content and a second portion of the source content. The computing device may determine a first location of the first relationship within an index. The computing device may identify a user location within the index. The computing device may determine whether the user location is located beyond the first location within the index. The computing device may display the first relationship to the user based on the determination that the user location is beyond the first location.

BRIEF DESCRIPTION OF THE SEVERAL DRAWINGS

DETAILED DESCRIPTION

Embodiments of the present invention will now be described in detail with reference to the accompanying Figures.

Figure 1:
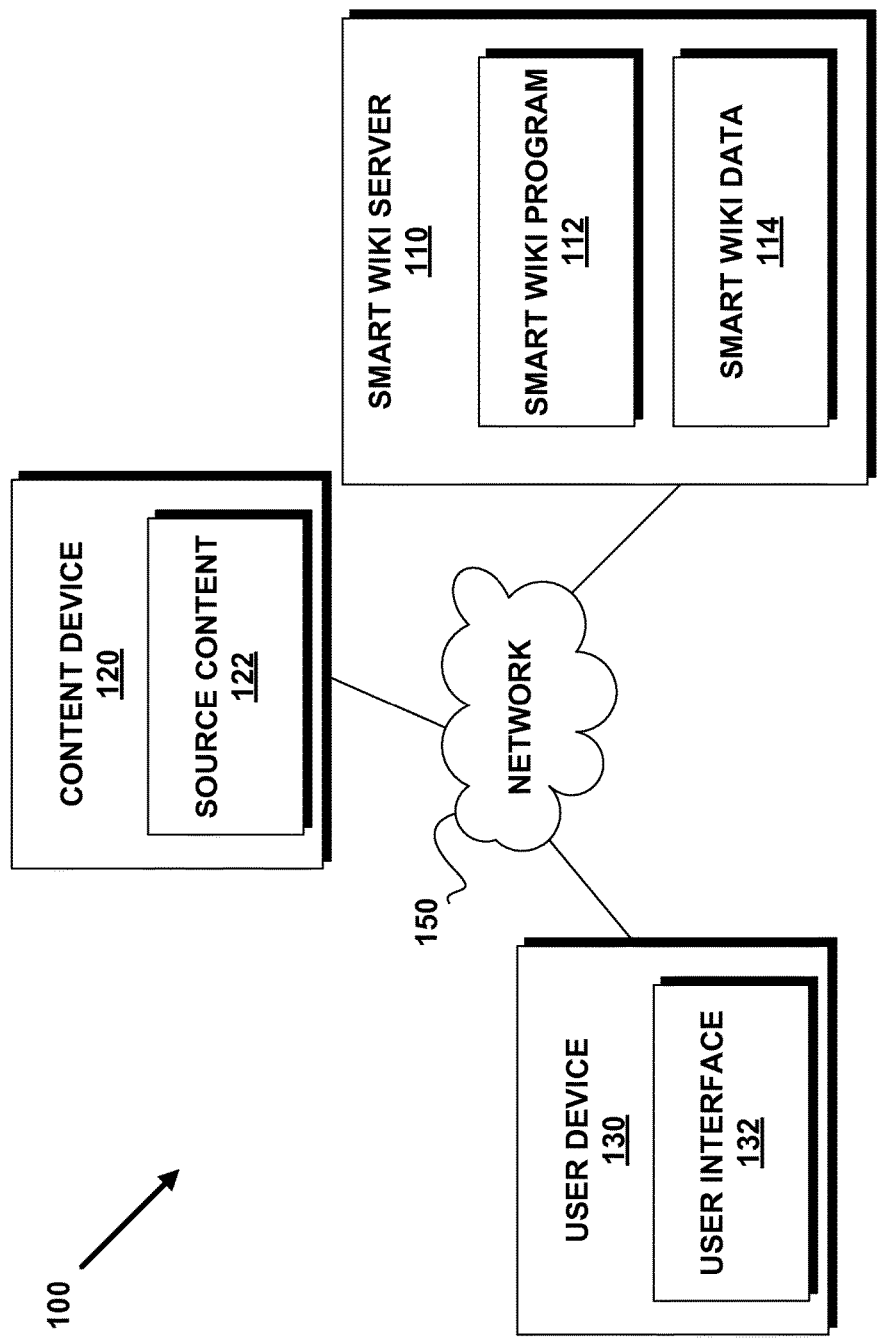
FIG. 1 illustrates a self-building smart encyclopedia system, in accordance with an embodiment of the invention.

FIG. 1 illustrates self-building smart encyclopedia system 100, in accordance with an embodiment of the invention. In an example embodiment, self-building smart encyclopedia system 100 includes a self-building smart encyclopedia server 110, a content device 120, and a user device 130 interconnected via a network 150.

In the example embodiment, network 150 is the Internet, representing a worldwide collection of networks and gateways to support communications between devices connected to the Internet. Network 150 may include, for example, wired, wireless or fiber optic connections. In other embodiments, network 150 may be implemented as an intranet, a local area network (LAN), or a wide area network (WAN). In general, network 150 can be any combination of connections and protocols that will support communications between the self-building smart encyclopedia server 110, user device 130, and the content device 120.

Content device 120 may contain source content 122. Content device 120 may be a desktop computer, a notebook, a laptop computer, a tablet computer, a handheld device, a smart-phone, a thin client, or any other electronic device or computing system capable of storing audio, visual, or textual content and receiving and sending that content to and from other computing devices such as self-building smart encyclopedia server 110 via network 150. In some embodiments, content device 120 includes a collection of devices, or data sources, in order to build the self-building smart encyclopedia. Content device 120 is described in more detail with reference to FIG. 3.

Source content 122 is a collection of content located in files including, but not limited to, for example, audio, visual and textual content. Source content 122 may be, for example, a text document, such as a book, audio content, such as a lecture, video content, such as a presentation, or visual content, such as a digital illustration. Source content 122 is located on content device 120 that can be accessed through using a network 150.

User device 130 may include user interface 132. User device 130 may be a desktop computer, a notebook, a laptop computer, a tablet computer, a handheld device, a smart-phone, a thin client, or any other electronic device or computing system capable of receiving and sending content to and from other computing devices, such as self-building smart encyclopedia server 110, via network 150. User device 130 is described in more detail with reference to FIG. 3.

User interface 132 includes components used to receive input from a user and transmit the input to a self-building smart encyclopedia program 112 residing on self-building smart encyclopedia server 110, or conversely to receive information from self-building smart encyclopedia program 112 and display the information to the user. In an example embodiment, user interface 132 uses a combination of technologies and devices, such as device drivers, to provide a platform to enable users of user device 130 to interact with self-building smart encyclopedia program 112. In the example embodiment, user interface 132 receives input, such as textual input received from a physical input device, such as a keyboard, via a device driver that corresponds to the physical input device.

Self-building smart encyclopedia device 110 includes self-building smart encyclopedia program 112 and self-building smart encyclopedia data 114. In the example embodiment, self-building smart encyclopedia server 110 desktop computer, a notebook, a laptop computer, a tablet computer, a thin client, or any other electronic device or computing system capable of storing compiling and organizing audio, visual, or textual content and receiving and sending that content to and from other computing devices, such as user device 130 and content device 120, via network 150. Self-building smart encyclopedia server 110 is described in more detail with reference to FIG. 3.

Self-building smart encyclopedia data 114 is a collection of data, obtained from processing of source content 122 by self-building smart encyclopedia program 112. The data may contain information concerning relationships between specific elements (characters, events, concepts, etc.). Additionally, the data may contain indexing information about the relationship between the specific elements, characterizing where the relationship occurred, or certain characteristics of the relationship.

Self-building smart encyclopedia program 112 is a program capable of building the collection of data for self-building smart encyclopedia data 114 from source content 122, and retrieving specific content to be displayed by user interface 132 based on input received on user interface 132. Self-building smart encyclopedia program 112 may contain modules for natural language processing, speech recognition and visual recognition, and additional add-ons that may enable processing of multiple types of content contained on content device 120. Self-building smart encyclopedia program 112 may additionally contain relationship modules for determining relationships between terms, phrases, or other forms of parsed information, and may classify those relationships based on an index map. The index map may represent characteristics about the context in which the relationship was determined such as, for example, page number in a book, episode number of a TV show, course number/level from a textbook, etc. Additionally, the self-building smart encyclopedia program 112 may receive information about a user's knowledge of a subject, and create a wiki page tailored to that knowledge. The operations and functions of self-building smart encyclopedia program 112 are described in further detail below with regard to FIG. 2.

Figure 2A:
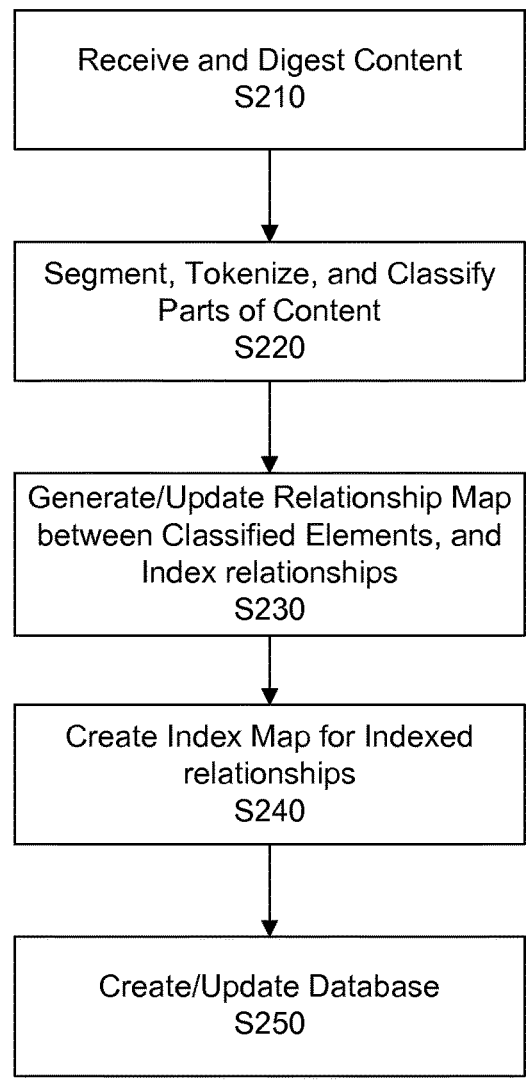
FIG. 2a is a flowchart illustrating the building of a self-building smart encyclopedia database using the self-building smart encyclopedia program of FIG. 1 in determining what document to display based on a shortcut input, in accordance with an embodiment of the invention.
Figure 2B:
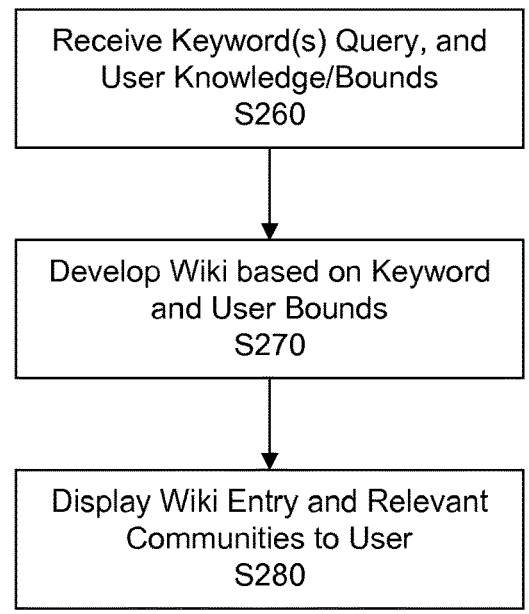
FIG. 2b is a flowchart illustrating the displaying a wiki page from the self-building smart encyclopedia database using the self-building smart encyclopedia program of FIG. 1 in determining what document to display based on a shortcut input, in accordance with an embodiment of the invention.

FIGS. 2a and 2b are flow charts illustrating the operation of the self-building smart encyclopedia program 112. FIG. 2a represents the method for ingesting and organizing the information from source content 122 into self-building smart encyclopedia data 114. FIG. 2b represents disseminating information from self-building smart encyclopedia data 114, based on specific bounds for a user.

Referring to step S210, self-building smart encyclopedia program 112 receives source content 122 from content device 120, and processes content for subsequent processing. Furthermore, self-building smart encyclopedia program 112 may receive additional content from one or more sources, or one or more devices. Self-building smart encyclopedia program 112 may then process the received content into a form that may be further digested and organized, such as text. For example, when creating a self-building smart encyclopedia entry for a super hero, self-building smart encyclopedia program 112 may receive source content from databases containing information related to comic books, movies, books, or any other source material for said super hero. The self-building smart encyclopedia program 112 may utilize techniques, such as natural language processing, speech recognition, visual recognition software, to process source content 122, such as the pictures from the comic books, or audio and visual content from movies, into a narrative description with dialogue, which may enable self-building smart encyclopedia program 112 to process the content in subsequent steps. For example, self-building smart encyclopedia program 112 may utilize natural language processing and string matching techniques to parse through a comic book and identify the characters, identify the relationships between the characters, and the events taking place in the comic book.

Referring to step S220, the self-building smart encyclopedia program 112 may begin to ingest the processed content into tokens, wherein such tokens are indexed as to where they exist in received content. Self-building smart encyclopedia program 112 begins by segmenting the processed content into tokens. Each token represents a meaningful element of the text, such as proper nouns, verbs, phrases or other parts or speech necessary to describe a relationship between multiple characters, events, places, concepts, etc. Tokens may be created by segmenting the source content 122 into discrete partitions, such as parts of speech (nouns, verbs), based on stand-alone words and known terms from a dictionary; or into more complex phrases (e.g. pronouns of more than 1 word) based on context, and frequency of groupings (e.g. correlation, or interdependence, between words). Additionally, pronouns may be linked to proper tokens based on context in the content (e.g. book), or within the segment of speech. Following tokenization (creating tokens), each token may be classified as a character, place, event, unknown, etc. Additionally, tokenization may determine multiple names or phrases that may interchangeably correspond to each token (e.g. Superman and Clark Kent) based on the context the tokens are located in, using machine learning techniques.

Referring to step S230, a relationship map may be generated, and iteratively updated, mapping each classified token to other classified tokens, and indexing how the mapped relationship occurred. The relationship map may represent links in a story, or description, where the classified tokens are interacting based on proximity (e.g. tokens are located in same sentence, paragraph, page, chapter) or context. For example, the relationship map may link two characters due to an action occurring between the two (the Hulk is fighting Iron Man), or because a character is located in a certain place (Cersei is at King's Landing), or between two related concepts (atoms make up molecules). In one example, the index of such a relationship may be location in the content (e.g. book, chapter, page). In another example, the index of a token may be based on a historical chronology (e.g. month/day/year).

Referring to step S240, in some embodiments an index map may be created, where the index map orders unindexed relationships. The index map either links unindexed content (corresponding to unindexed relationships) to previously indexed relationships, or creates an order in which a group of unindexed relationships may be presented. In one embodiment, the index map may link unindexed content analyzing a narrative (e.g. social media such as blogs, forums, and microblogs) to specific places in the narrative based on the characters, places and events presented in the analysis to characters places and events that have previously occurred in a book. Additionally, the index map may find links due to proximity of the posting of the social media to when the source content was aired (e.g. microblogging occurring during an episode is related to that episode).

In another embodiment, an index map may be generated for concepts, by ordering the complexity of certain concepts based on the strength and order of relationships between tokens. The self-building smart encyclopedia program 112 may determine a first concept may include multiple mentions of a second concept, while the second concept rarely mentions the first. Such ordering may lead to ordering the second concept before the first. For example, in chemistry certain concepts are taught before others, because earlier concepts are needed to describe later concepts (e.g. atoms are taught before molecules, enthalpy is taught before entropy). In both examples, molecules are made up of atoms, and thus most of the discussion of molecules necessarily contains a discussion of atoms, and thus atoms would be ordered first.

Referring to step S250, self-building smart encyclopedia data 114, is updated with the relationship map and index map created in steps 5230 and 5240. During the update, previously created data may be updated based on the current index map or relationship map. The self-building smart encyclopedia data is maintained such that the information may be obtained later and displayed to a user during a subsequent request by the user.

Referring to step S260, self-building smart encyclopedia program 112 receives a keyword(s) query from the user, as well as specific bounds and parameters concerning a user's knowledge. The specific bounds may define specific sources of content the user wants to know about. For example, when entering a query concerning Spiderman, a user may enter bounds of "comic book" such that the query is bounded to only return information generated by the comic book. The user's knowledge may relate the user's place in a story (e.g. book and chapter) and may limit the query to only information located in previous chapters (e.g. eliminating "spoilers"). In another embodiment, the user may additionally select the criterion of how to order knowledge, such as place in a set story verses chronology of events in said story. For example, a user may select chronology of a story, which would return events based on when they occurred inside the universe of the story, and not the order that they were introduced by the author of a story. Further, a user's knowledge may represent their aptitude for the subject matter.

Referring to step S270, a wiki entry is created based on search of self-building smart encyclopedia data 114, based on the bounded keyword results. The self-building smart encyclopedia program 112 may take the bounds and parameters entered by the user, and determine where in the index map such bounds or parameters may be (e.g. index point). The self-building smart encyclopedia program 112 may then search the relationship map for the keyword, or keywords, entered by the user and determine which relationships and tokens are associated with the entered keyword(s) that existed before the index point. The entry may be created using a listing of the relationships and tokens to the keyword (e.g. Spiderman was created when Peter Parker was bit by a radioactive spider on a field trip), or the existence of a specific relationship between concepts (e.g. atoms contain subatomic particles such as a proton, a neutron and an electron). The wiki entry may be created using the most important relationships from the relationship map, as determined using by occurrence (e.g. how often tokens are found near each other), distance of tokens relative to one another, order of tokens, interaction of tokens determined through natural language processing, or using other relevant techniques. Additionally, the wiki entry may preferentially select relationships that exist closer to the index points (e.g. recent events in a story are displayed over events in the past).

referring to step S280, the wiki entry, and relevant communities, are presented to the user. The wiki entry from step S270 is displayed to the user by user interface 132 on user device 130. The relevant communities for a specific keyword, are received from the index map created in step S240, and contain links to blogs, forums, or other social content discussing the specific keywords that the user searched at the specific knowledge point the user is currently at. This may create a wiki service in which a user is free from spoilers about a specific topic, by constraining the content of the page to only previous events, and constraining social discussion to the same content. Additionally, this may create a wiki service where specificity and depth of content is tailored to a user's previous knowledge, whereby user's with little knowledge about a topic and users with advanced knowledge about a topic would view pages with differing levels of specificity and terminology.

Figure 3:
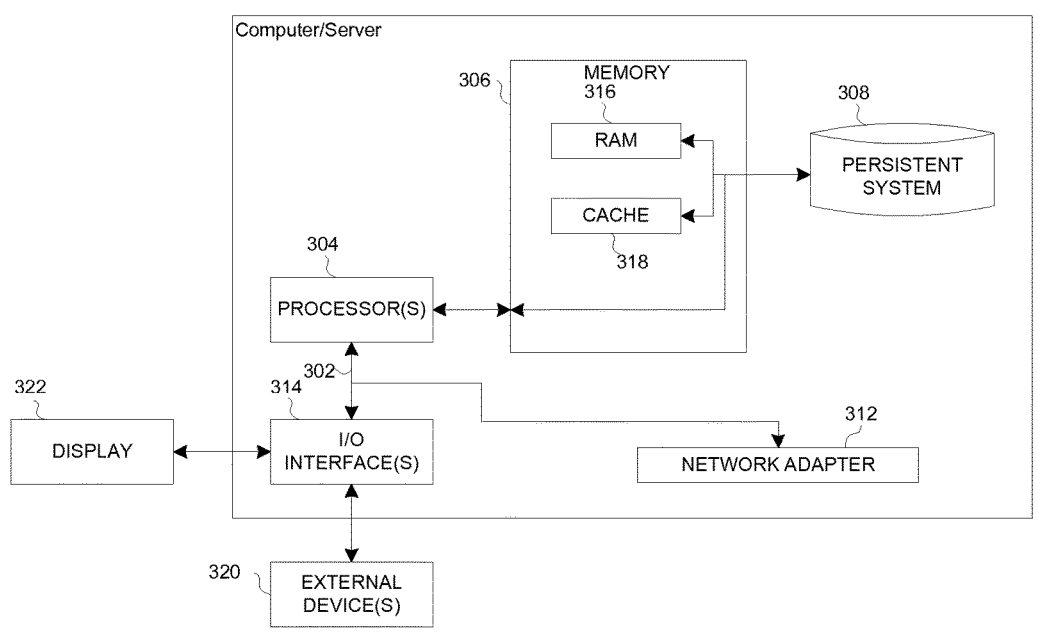
FIG. 3 is a block diagram depicting the hardware components of the self-building smart encyclopedia system of FIG. 1, in accordance with an embodiment of the invention.

FIG. 3 depicts a block diagram of components of self-building smart encyclopedia server 110, content device 120 and user device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Self-building smart encyclopedia server 110, content device 120 and user device 130 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs self-building smart encyclopedia program 112 and self-building smart encyclopedia data 114 in self-building smart encyclopedia server 110; source content 122 in content device 120; and user interface 132 stored in user device 130 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs self-building smart encyclopedia program 112 and self-building smart encyclopedia data 114 in self-building smart encyclopedia server 110; source content 122 in content device 120; and user interface 132 stored in user device 130 may be downloaded to persistent storage 308 through communications unit 312.

I/O interface(s) 314 allows for input and output of data with other devices that may be connected to self-building smart encyclopedia server 110, content device 120 and user device 130. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., The programs self-building smart encyclopedia program 112 and self-building smart encyclopedia data 114in self-building smart encyclopedia server 110; source content 122 in content device 120; and user interface 132 stored in user device 130, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for a smart encyclopedia, the method comprising:
    receiving source content;
    determining a first relationship, wherein the first relationship corresponds to a relationship between a first portion of the source content and a second portion of the source content;
    determining a first location of the first relationship within an index, wherein the index comprises an ordered arrangement of one or more locations within the source content based on a directional strength of each relationship to all other relationships, wherein the order of each relationship to another relationship in the index is based on a directionality of references between the relationships;
    identifying a user location within the index;
    determining whether the user location is in a location that is after the first location within the index; and
    based on determining that the user location is in a location that is after the first location, displaying the first relationship to the user.

2. The method of claim 1, further comprising:
    determining a second relationship, wherein the second relationship corresponds to a relationship between a third portion of the source content and a fourth portion of the source content;
    determining a second location of the second relationship within an index;
    determining whether the user location is in a location that is after the second location within the index; and
    based on determining that the user location is in a location that is before the second location, withholding the second relationship from the user.

3. The method of claim 1 further comprising:
    receiving analyzing content, wherein the analyzing content comprises unindexed content analyzing the source content;
    mapping relationships in the analyzing content to relationships in the source content based on events referenced in the analyzing content and the source content; and
    based on determining that the user location is in a location that is after the first location, displaying, to the user, relationships from the analyzing content that are mapped to the first relationship.

4. The method of claim 3, wherein mapping is further based on proximity of publication of the source content to the analyzing content.

5. The method of claim 1, wherein determining the first relationship comprises:
    determining the first portion of the source content is within a certain proximity to the second portion of the source content.

6. The method of claim 1, wherein the index details a chronological order of the source content.

7. The method of claim 1, further comprising:
    receiving social media content;
    determining a first content from the social media content associated with the first relationship; and
    displaying the first content relating to the first relationship.

8. The method of claim 1, further comprising tokenizing the source content, wherein tokenizing the source content includes segmenting the first portion of the source content from the source content based on a determined correlation between one or more terms within the first portion, and segmenting the second portion of the source content from the source content based on a determined correlation between one or more terms within the second portion.

9. A computer program product for a smart encyclopedia, the computer program product comprising:
    one or more computer-readable storage devices and program instructions stored on at least one of the one or more tangible storage devices, the program instructions comprising:
    program instructions to receive source content;
    program instructions to determine a first relationship, wherein the first relationship corresponds to a relationship between a first portion of the source content and a second portion of the source content;

program instructions to determine a first location of the first relationship within an index, wherein the index comprises an ordered arrangement of one or more locations within the source content based on a directional strength of each relationship to all other relationships, wherein the order of each relationship to another relationship in the index is based on a directionality of references between the relationships;

program instructions to identify a user location within the index;

program instructions to determine whether the user location is in a location that is after the first location within the index; and based on a determination that the user location is in a location that is after the first location, program instructions to display the first relationship to the user.

10. The computer program product of claim 9, further comprising:

program instructions to determine a second relationship, wherein the second relationship corresponds to a relationship between a third portion of the source content and a fourth portion of the source content;

program instructions to determine a second location of the second relationship within an index;

program instructions to determine whether the user location is in a location that is after the second location within the index; and based on a determination that the user location is in a location that is before the second location, program instructions to withhold the second relationship from the user.

11. The computer program product of claim 9, further comprising program instructions to tokenize the source content, wherein the program instructions to tokenize the source content includes program instructions segment the first portion of the source content from the source content based on a determined correlation between one or more terms within the first portion, and program instructions to segment the second portion of the source content from the source content based on a determined correlation between one or more terms within the second portion.

12. The computer program product of claim 9, wherein determining the first relationship comprises:

program instructions to determine the first portion of the source content is within a certain proximity to the second portion of the source content.

13. The computer program product of claim 9, wherein the index details a chronological order of the source content.

14. The computer program product of claim 9, further comprising:

program instructions to receive social media content;

program instructions to determine a first content from the social media content associated with the first relationship; and program instructions to display the first content relating to the first relationship.

15. A computer system for a smart encyclopedia, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive source content;

program instructions to determine a first relationship, wherein the first relationship corresponds to a relationship between a first portion of the source content and a second portion of the source content;

program instructions to determine a first location of the first relationship within an index, wherein the index comprises an ordered arrangement of one or more locations within the source content based on a directional strength of each relationship to all other relationships, wherein the order of each relationship to another relationship in the index is based on a directionality of references between the relationships;

program instructions to identify a user location within the index;

program instructions to determine whether the user location is in a location that is after the first location within the index; and based on a determination that the user location is in a location that is after the first location, program instructions to display the first relationship to the user.

16. The computer system of claim 15, further comprising:

program instructions to determine a second relationship, wherein the second relationship corresponds to a relationship between a third portion of the source content and a fourth portion of the source content;

program instructions to determine a second location of the second relationship within an index;

program instructions to determine whether the user location is in a location that is after the second location within the index; and based on a determination that the user location is in a location that is before the second location, program instructions to withhold the second relationship from the user.

17. The computer system of claim 15, wherein the index details a chronological order of the source content.

18. The computer system of claim 15, further comprising program instructions to tokenize the source content, wherein the program instructions to tokenize the source content includes program instructions segment the first portion of the source content from the source content based on a determined correlation between one or more terms within the first portion, and program instructions to segment the second portion of the source content from the source content based on a determined correlation between one or more terms within the second portion.

19. The computer system of claim 15, wherein determining the first relationship comprises:

program instructions to determine the first portion of the source content is within a certain proximity to the second portion of the source content.

* * * * *